US008652233B2

(12) United States Patent
Kramer et al.

(10) Patent No.: US 8,652,233 B2
(45) Date of Patent: Feb. 18, 2014

(54) ON-BOARD HYDRAULIC FLUID DEGASIFICATION SYSTEM FOR A HYDRAULIC HYBRID VEHICLE

(75) Inventors: Dustin Kramer, Helotes, TX (US);
David Williams, San Antonio, TX (US);
Sterling Imfeld, Dexter, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 196 days.

(21) Appl. No.: 13/433,839

(22) Filed: Mar. 29, 2012

(65) Prior Publication Data
US 2012/0247324 A1 Oct. 4, 2012

Related U.S. Application Data

(60) Provisional application No. 61/470,300, filed on Mar. 31, 2011.

(51) Int. Cl.
*B01D 19/02* (2006.01)
(52) U.S. Cl.
USPC .......... 95/14; 95/242; 95/24; 96/179; 96/159; 96/160
(58) Field of Classification Search
USPC ........... 95/242, 14, 24; 96/179, 159, 160, 157
See application file for complete search history.

(56) References Cited

U.S. PATENT DOCUMENTS

| 2,184,195 | A | * | 12/1939 | Olof Naucler Johan | 95/242 |
| 2,376,794 | A | * | 5/1945 | Leon Mcculloch | 96/179 |
| 2,870,859 | A | | 1/1959 | Topol | |
| 2,962,863 | A | | 12/1960 | Caroli | |
| 3,321,909 | A | | 5/1967 | Gordon | |
| 3,747,304 | A | * | 7/1973 | Elmer et al. | 96/179 |
| 3,853,500 | A | | 12/1974 | Gassmann et al. | |
| 4,371,318 | A | | 2/1983 | Kime | |
| 4,398,930 | A | | 8/1983 | Larson | |
| 5,108,655 | A | | 4/1992 | Johns, Jr. | |
| 5,461,903 | A | | 10/1995 | Harms | |
| 5,601,635 | A | | 2/1997 | Roffelsen | |
| 5,727,390 | A | | 3/1998 | Hartle | |
| 5,749,945 | A | | 5/1998 | Beck | |
| 6,454,835 | B1 | * | 9/2002 | Baumer | 95/19 |
| 7,449,051 | B2 | * | 11/2008 | Olsen | 95/242 |
| 2008/0276608 | A1 | | 11/2008 | Anderson | |

FOREIGN PATENT DOCUMENTS

SU 1318246 A1 6/1987

* cited by examiner

*Primary Examiner* — Duane Smith
*Assistant Examiner* — Douglas Theisen
(74) *Attorney, Agent, or Firm* — David H. Read

(57) ABSTRACT

A fluid degasification system for a hydraulic circuit includes a gas/fluid separation tank, a fluid entry passage directing fluid into a small foam generating cup containing foam and a small amount of additional fluid, thereby stimulating foam formation. A separation screen is positioned below the foam generating cup to receive bubbles formed in the cup and to allow liquid to pass through the screen to a degasified-fluid collecting chamber below the screen as the bubbles resting on the separation screen decompose.

17 Claims, 2 Drawing Sheets

ON-BOARD HYDRAULIC FLUID DEGASIFICATION SYSTEM FOR A HYDRAULIC HYBRID VEHICLE

CROSS REFERENCE TO RELATED APPLICATIONS

This application claims priority from U.S. Provisional Application 61/470,300, "On-Board Hydraulic Fluid Degasification System for a Hydraulic Hybrid Vehicle," filed on Mar. 31, 2011.

BACKGROUND OF THE INVENTION

1. Technical Field

The invention is directed to removal of dissolved gases from hydraulic fluid in fluid power systems, in particular for hydraulic hybrid vehicle applications.

2. Description of the Related Art

Some fluid power systems use hydraulic accumulators. Hydraulic accumulators store hydraulic fluid that is pressurized against a gas cushion. The gas is physically separated from the fluid by a structure, such as a flexible bladder or a sliding piston. The most commonly used gas is nitrogen, due to its low cost and relatively inert properties. Unfortunately, all known bladder materials are somewhat permeable to nitrogen. This causes the fluid in any bladder accumulator to become contaminated with dissolved nitrogen over time, leading to degraded performance of the hydraulic system. Piston accumulators can also be susceptible to nitrogen contamination due to gas permeation across the seal of the piston. Gas permeation tends to increase with higher operating pressures, and is a significant problem at the high pressures found in hydraulic hybrid vehicle systems (e.g., 5,000-7,000 psi).

It can therefore be important to manage nitrogen contamination in a high pressure hydraulic system that employs a hydraulic accumulator. In order to separate dissolved gas from fluid, previously known degasification devices have generally utilized vacuum chambers, swirling/vortex methods, long-delay settling tanks, or mechanical or other external agitation methods to stimulate degasification. A simple, fast, and inexpensive degasification system tailored for a hydraulic hybrid vehicle is needed in the art. While it is possible to simply replace the fluid at periodic intervals, a more practical and less service-intensive solution is desired. For hydraulic hybrid vehicle applications, it would be particularly preferable to devise a fluid degasification system that could be carried on-board the vehicle by which dissolved nitrogen could be continuously or periodically removed and maintained within acceptable limits. Because hydraulic fluid tends to form foamy bubbles when dissolved gas is rapidly released from it, a fluid degasification device preferably will also provide for efficient separation of the resulting foam into its gas and liquid components.

OBJECT OF THE INVENTION

It is therefore an object of the invention to remove dissolved and entrained gases from hydraulic fluid within a working hydraulic circuit, particularly for hydraulic hybrid vehicles.

SUMMARY OF THE INVENTION

According to the present invention, a degasification system includes a separation tank for separation of gas from hydraulic fluid, with the tank having a bottom portion for collection of degasified fluid, and a top portion for collection of gas that has been separated from the hydraulic fluid. Fluid needing degasification enters the separation tank in the top portion of the separation tank and is directed into a small foam generating cup that contains a small volume of foam and fluid. The air pressure in the separation tank is preferably near ambient atmospheric pressure, but less than the pressure of the entering hydraulic fluid, since the reduction in pressure of the hydraulic fluid that occurs as it enters the separation tank improves bubble formation. The small foam generating cup is affixed inside the separation tank in a position to have the entering untreated fluid cross an air gap and contact the small volume of fluid within the foam generating cup. The contact and resulting turbulence from the impact of the untreated fluid with the small volume of fluid and foam in the cup greatly facilitates and accelerates bubble formation. Resulting foam that overflows the cup's brim then falls and collects on a separation screen placed somewhere below the cup, which screen separates the top and bottom portions of the separation tank. Holes in the separation screen are designed to prevent bubbles and foamy oil from passing through, but to allow degasified oil to drip through as the foam bubbles coalesce and decompose. The degasified fluid at the bottom of the separation tank may then be pumped out for reuse within the fluid power system. Gas that accumulates at the top of the separation tank is vented to the atmosphere.

One or more foam level sensors, preferably in the form of a float or similar device, may be used to monitor the height of the foam that has collected on the separation screen. This is because the flow rate through the separation screen depends on the foam height, such that fluid flow through the degasification device may be determined and regulated through foam height, e.g., by targeting a preferred height of foam above the screen.

Over prior art, this invention has the advantages of (1) greatly increasing the rate of deaerating a fluid into a foam, and (2) greatly increasing the rate of gas and liquid separation from the resultant foam, (3) in an inexpensive assembly easily carried on-board a motor vehicle.

DETAILED DESCRIPTION

Figure 1:
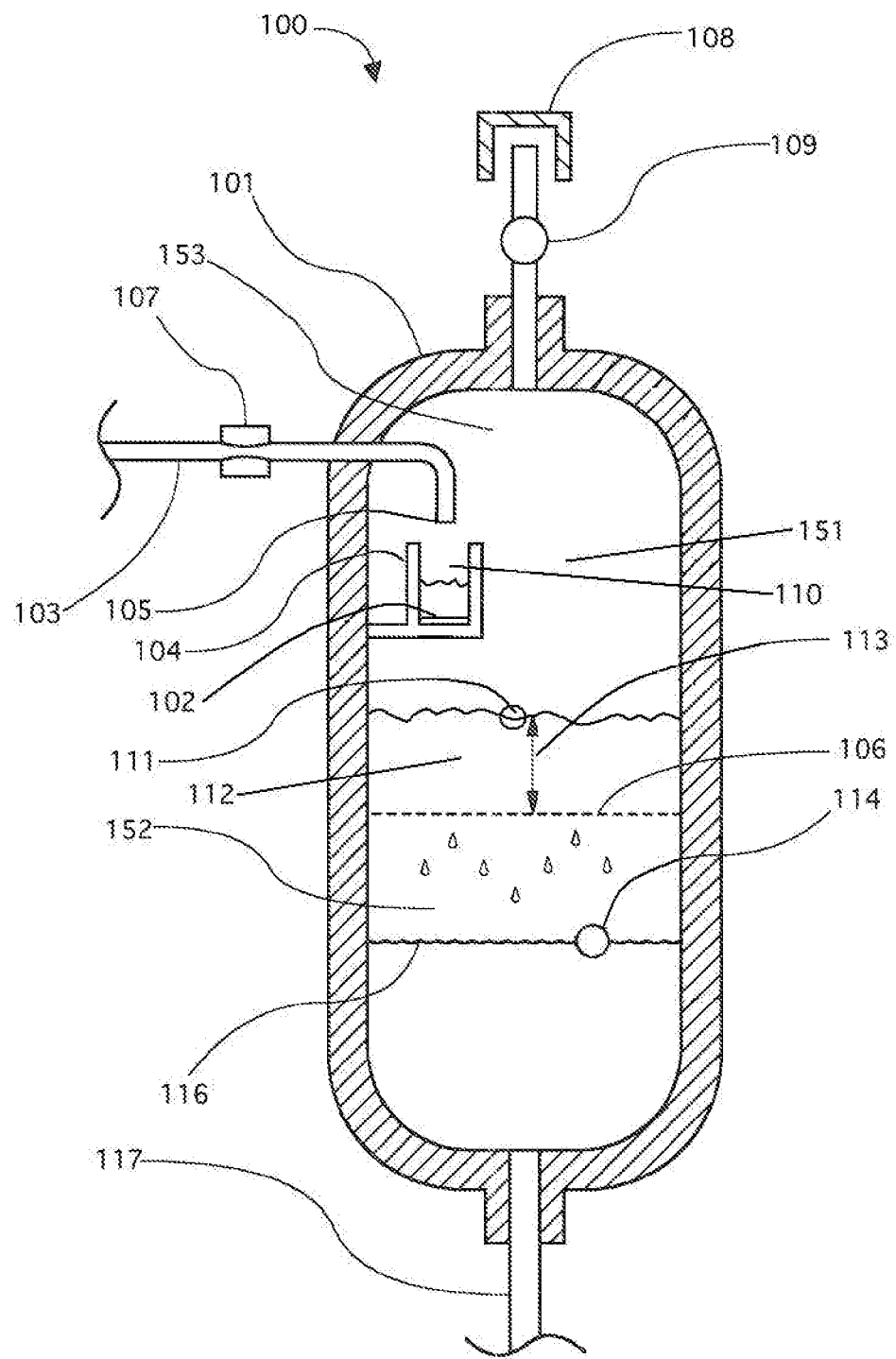
FIG. 1 is a sectional view of a fluid/gas separation tank.

Referring to FIG. 1, degasification device 100 is shown, including separation tank 101, separation screen 106, foam generating cup 104 and fluid inlet 103. Separation screen 106 effectively separates the interior volume of tank 100 into an upper section 151, meant for collection of gas and foam, and a lower section 152, meant for collection of degasified liquid. Fluid enters the upper section 151 from the low pressure side of a hydraulic fluid power circuit (not shown) by means of tube 103 and fluid inlet port 105 (alternatively, fluid could enter through an orifice in the separation tank 101 above cup 104, which orifice would also constitute a fluid inlet port, without need for a tube) into cup 104 which is open to upper section 151. A gap 110 exists between fluid inlet port 105 and fluid surface level 102 in cup 104. Gap 110 is occupied with air. Cup 104 may be attached to the interior of tank 101, or tube 103, or any static structure. The volume within separation tank 101 is held at a low pressure (near ambient) by being open to the atmosphere, for example via a breather cap 108 and optionally a weakly sprung relief valve 109. Therefore the pressure in tank 101 is lower than the pressure in the low pressure side of the hydraulic circuit 200 (in FIG. 2). For example, the low pressure side of a sealed hydraulic circuit might be perhaps 50 psi, while the degasification tank may be near atmospheric pressure. The volume of tank 101 is preferably in the range of one to five gallons, but may be any volume that is appropriate to the specific application.

In operation, low pressure fluid from a hydraulic circuit passes through tube 103, past optional orifice 107, and into foam generating cup 104 through fluid inlet port 105. Alternatively, orifice 107 may be replaced by a narrowing of the tip of fluid inlet port 105. Owing to the brief pressure change that occurs as the fluid passes the narrowed cross sectional area of optional orifice 107 (or the narrowed tip if provided), dissolved gas present in the fluid begins to form entrained bubbles so that fluid exiting at fluid inlet port 105 is actually a mixture of liquid and entrained bubbles. Upon exiting fluid inlet port 105 this mixture is then additionally exposed to the relatively lower pressure within tank 100, causing the bubbles to expand rapidly and form a foam in cup 104. The contact and resulting turbulence from the impact of the untreated fluid with the small volume of fluid and foam in the cup greatly facilitates and accelerates bubble formation. The foam may then overflow cup 104 (e.g., at the brim of cup 104 or through one or more alternative openings in the cup 104 to tank section 151) to enter and collect within the greater volume of upper section 151. By the force of gravity, this overflowed foam will then collect upon separation screen 106, which has a preferred mesh size of about 300 to 400 openings per linear inch. As the foam contacts the separation screen 106, some of the foam decomposes into deaerated liquid which will fall through the separation screen 106 into lower section 152, while the gas thus freed rises to collect in head space 153.

It should be noted that while cup 104 is generally described herein as a small cup, with a diameter of perhaps just a few inches, an equivalent small vessel of different shape could also perform the same function. In addition, references to a "small" volume of fluid in the cup will mean a volume of 5 ounces or less for purposes of this application.

As mentioned above, the invention preferably uses one or more layers of very fine screen (e.g. 300 to 400 mesh) to separate foam from the deaerated fluid, while promoting the decomposition of the foam into gas and liquid. In contrast to using a coarse screen, applicants have discovered that such a fine mesh screen not only promotes the breakage of bubbles but also serves to better physically separate the foam phase from the liquid phase, with deaerated fluid able to pass through the small openings in the separation screen while the gas bubbles, including the very fine bubbles characteristic of foam, are blocked and remain above the screen. The bubbles, of course, are lighter than the fluid and either larger than the openings in the screen or are collapsed as they enter the openings. The gas that was within the bubbles rapidly rises above the foam layer on the screen and is removed or vented from the space above the foam.

Affected by the rate at which foam is being generated at cup 104 relative the rate at which it decomposes on separation screen 106, a volume of bubbles/foam 112 preferably collects upon screen 106. Depending on the pressure and temperature within the tank, there exists an optimum foam height (height 113, which may be, for example, 2-6 inches) that will maximize the rate of foam decomposition. The optimum height will depend on conditions such as the fluid used, the screen mesh size, and other factors, and should be determined experimentally for the expected conditions. Thereafter, it is a concern of the invention to monitor the height of foam above screen 106 in order to maintain it as near as possible to the predetermined optimum height by regulating the flow of fluid into the tank.

One or more foam level sensors (for example, foam level sensor 111) measure the foam level, resulting in an estimation of the foam level which can then be used to estimate a foam height 113 above screen 106. A value representing this height may then be transmitted to a CPU (not shown) that may use the value to determine a rate of flow to be allowed into tank 101. Sensor 111 is preferably of the float type that returns a signal representing a height within a range of heights. Alternatively, sensor 111 may simply be mechanically positioned at a maximum desired foam level height. In normal operation the fluid level would remain well above the level at which deaerated fluid is drawn out, by controlling the flow of fluid from the hydraulic system into the degasification system by means of a valve or similar device.

Liquid that has passed through separation screen 106 will collect in lower section 152 of tank 100. This liquid (represented here by liquid surface 116) is deaerated fluid that is ready to re-enter the low pressure side of the hydraulic circuit from which it came. Fluid return line 117 is provided to allow this fluid to thereby be drawn back into the circuit. Separation screen 106 not only promotes the breakdown of foam into deaerated liquid, but also prevents any foam from being present in lower section 152 so that any fluid drawn back does not contain foam. Additionally, one or more liquid level sensors such as sensor 114 are provided to monitor the level of liquid so that fluid will not be drawn into the circuit if the level is below a certain threshold. Sensor 114 is also preferably of the float type that returns signals representing a height within a range of heights.

One or more much coarser screens (not shown) may optionally be provided anywhere above the separation screen 106. An additional screen may, for example, be 10 to 30 mesh, or a finer screen such as 100 to 200 mesh to provide some bubble/gas removal of a cold or viscous foam/fluid mixture while allowing sufficient fluid flow through the screen.

Figure 2:
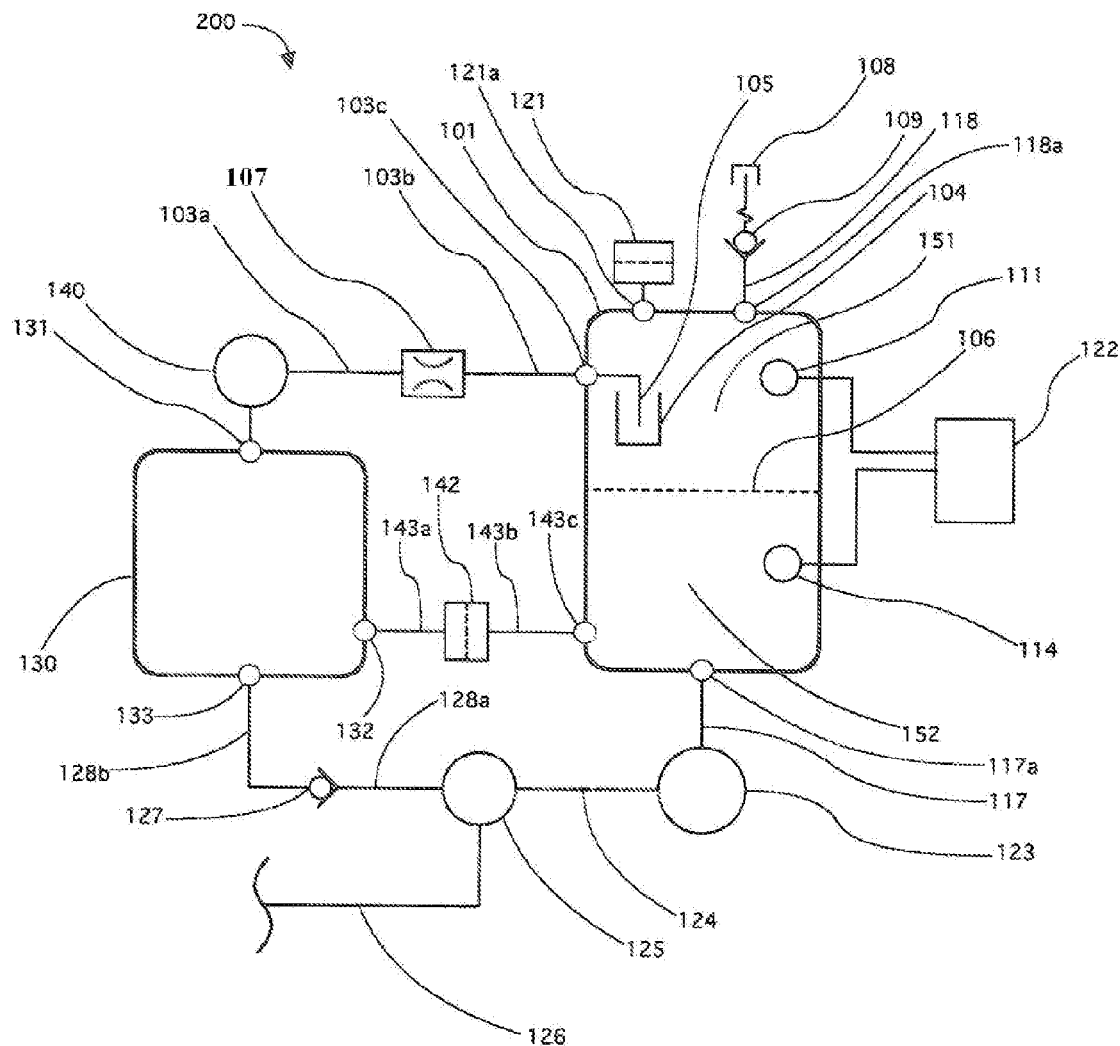
FIG. 2 is a schematic of a fluid degasification circuit that utilizes the separation tank.

Referring now to FIG. 2, the operation of the degasification device is seen in the context of a hydraulic circuit 200. Degasification tank 101 is disposed to receive, deaerate, and return low pressure fluid from hydraulic machine case 130. Case 130 may be the low-pressure, fluid-filled case of any hydraulic device, such as a bent-axis hydraulic pump/motor, hydraulic drive module, or a hydrostatic transmission, having a low pressure fluid port 131 preferably residing at a high point on the device. Alternatively, case 130 may simply be any fluid-filled point on the low pressure side of a hydraulic circuit, such as a low pressure manifold, a low pressure reservoir, or a low pressure fluid line. Fluid may also be taken from the high pressure side of a hydraulic circuit, but using such high pressure fluid is energy inefficient and the available higher pressure drop across an orifice is not needed to stimulate gas/fluid separation in the present invention.

Degasification tank 101 is here depicted with additional components useful for its effective operation in the context of the hydraulic circuit. For example, control valve 140 regulates flow into tank 101 from case 130. Pump 123 draws fluid from tank 101 via drain port 117a and return line 117. Rupture disc 121 (alternatively, a relief valve) prevents damage to tank 101 in case of a sudden high pressure release into the tank, such as a pump/motor blow-off event. CPU 122 receives signals from foam height sensor 111 indicating foam height, and from liquid level sensor 114 indicating liquid level. CPU 122 also controls control valve 140 and pump 123, and may be part of a vehicle controller. Optional switching valve 125 directs flow from pump 123 either back toward case 130 or to a secondary system (not shown), for example, a priming circuit that pre-pressurizes the high pressure side of the hydraulic circuit at system startup. Relief passage 143a, 143b connects tank 101 via port 143c with low pressure port 132 of wet case 130 to prevent overpressurizing of case 130 by relief valve 142. Relief valve 142 may alternatively be a rupture disk. A relief valve would be preferred over a rupture disk, because although a rupture disk would provide protection against overpressurization, it would also permit fluid to continue leaking into the separation tank until the low pressure accumulator could be shut off.

The degasification circuit operates as follows. Low pressure fluid having a component of dissolved gas flows from low pressure port 131 to regulating valve 140. If regulating valve 140 is open, fluid then passes through inlet line 103a, orifice 107, inlet line 103b and inlet port 103c. The degasification components in the separation tank 101 function as described for FIG. 1 above. Liquid having thus collected in lower section 152 is then drawn through drain port 117a and return line 117 by pump 123, and then conducted through line 124. Optional switching valve 125 may operate to selectively route the fluid either to line 128a (toward case 130) or to a secondary system (not shown) via auxiliary line 126. Fluid thus routed to line 128a then proceeds through check valve 127 and enters wet case 130 via line 128b and low pressure port 133. Gas that accumulates at the top of the separation tank 101 is vented to the atmosphere through port 118a and line 118 to breather cap 108.

CPU 122 receives a liquid height signal from liquid level sensor 114. Based on the indicated liquid level, CPU 122 then may issue a control signal to either or both of control valve 140 and/or pump 123 to modify the flow into and/or out of tank 101. For example, if the liquid level is at or above a maximum level, the flow through control valve 140 might be reduced in order to prevent overfilling of the lower section 152 of tank 101. If the liquid level is at or below a minimum level, the flow might be increased in order to prevent lower section 152 from running dry, and/or the flow through pump 123 might be reduced or stopped for the same purpose.

Further, CPU 122 receives a foam height signal from foam height sensor 111. Based on the indicated foam height, CPU 122 then may issue a control signal to control valve 140 to modify the flow into tank 101. For example, if the foam level is at or above a maximum level, the flow through control valve 140 might be reduced in order to reduce the formation of incoming foam and therefore prevent the foam height from exceeding this height. If the foam level detected by foam sensor 111 is below a desired foam level, the flow might be increased in order to allow the height of foam to increase.

Furthermore, it is known in the art that a hydraulic machine may in some rare circumstances experience what is called a "blow-off" event in which high pressure fluid is rapidly released to the low pressure side because the cylinder barrel has momentarily become unseated, or because of some failure in the high pressure components that results in leakage to the low pressure side. This could cause a momentary surge in the pressure on the low pressure side of the circuit, such as in case 130, possibly enough to rupture the case or any other devices connected to the low pressure side. To prevent damage to tank 101 in this event, pressure relief valve 121 is provided at port 121a. Alternatively the function of relief valve 121 could be provided by a rupture disk.

Because pump 123 acts to return fluid to case 130, it is conceivable that, in some unexpected failure condition, the flow through this pump into case 130 might exceed the flow able to exit through valve 140, causing the case to overpressurize. Relief passage 143a, 143b with relief valve 142 are provided to allow fluid to vent through port 143c to tank 101 in this event. Should tank 101 then begin to overpressurize from this incursion of fluid, rupture disk/relief valve 121 will then act to release pressure. Valve 121 may also be connected to a separate vessel to collect any fluid which may be expelled. Additionally, check valve 127 acts to prevent fluid from exiting improperly through return line 128b.

Another feature that may be beneficial when employed in a hydraulic hybrid vehicle application is the ability to use the volume in the tank 101 to buffer the fluid volume in the overall hydraulic system. For example, the effects of temperature changes on fluid volumes on cold or hot days can lead to overpressuring or underpressuring the hydraulic system in a closed system. The ability to use the separation tank to dynamically change the working volume of the hydraulic system, and control the effective accumulator precharge to counteract temperature effects, can help avoid overpressuring or underpressuring the hydraulic system.

The invention claimed is:

1. An apparatus for degasification of fluid, comprising:
   a separation tank;
   a first separation screen positioned within the separation tank, dividing the separation tank into an upper, gas-collecting section and a lower, fluid-collecting section, wherein the first separation screen comprises a plurality of orifices sufficiently small to catch and prevent passage of foam and bubbles that fall onto it, while allowing unfoamy fluid to pass through to the lower section;
   a fluid inlet port positioned in the upper gas-collecting section, for entry of fluid and entrained gas into the separation tank for degasification and fluid/gas separation;
   a foam-generating cup, configured to hold a small volume of fluid, positioned in the upper gas-collecting section above the first separation screen, and further positioned to receive the fluid and entrained gas from the fluid inlet port across an air gap above the fluid level in the cup to stimulate formation of bubbles upon contact between the fluids, and to allow a portion of the formed bubbles to then fall to the first separation screen below;
   a gas vent in the upper section allowing gas freed from the fluid to escape the separation tank; and
   a fluid outlet line in fluid communication with the lower section for conducting the degasified fluid from the lower section.

2. The apparatus of claim 1, additionally comprising a liquid level sensor positioned in the lower, fluid-collecting section of the separation tank.

3. The apparatus of claim 1, additionally comprising a foam level sensor residing in the upper section for sensing the height of foam resting on the first separation screen.

4. The apparatus of claim 1, additionally comprising:
   a pump connected to the fluid outlet line for drawing fluid from the separation tank; and
   a relief valve in the upper, gas-collecting section of the separation tank.

5. The apparatus of claim 1, wherein the first separation screen comprises a mesh with at least 300 openings per linear inch.

6. The apparatus of claim 5, further comprising a second separation screen, wherein the second separation screen is positioned above the first separation screen and comprises a mesh with fewer than 200 openings per linear inch.

7. A method for removing dissolved gas from fluid in a hydraulic system, comprising the steps of:
   conducting the fluid with the dissolved gas into a small foam generating vessel;

creating contact between the conducted fluid and the surface level of a second small volume of fluid present in the bottom of the foam generating vessel;

stimulating turbulent production of foam from the combined fluids within the small foam generating vessel;

allowing said foam to exit the foam generating vessel and rest upon a separation screen that prevents said foam from passing through the screen but which allows liquid separating from the foam to pass through the separation screen to a fluid-collecting chamber below the screen.

8. The method of claim 7, wherein the ambient pressure in the foam generating vessel is lower than the pressure of the incoming conducted fluid.

9. The method of claim 7, additionally comprising:
monitoring the height of foam resting upon the separation screen; and
maintaining the foam height within a target foam height range.

10. The method of claim 9 wherein the target foam height range has an upper limit below 6 inches and a lower limit above 2 inches.

11. The method of claim 7, additionally comprising:
monitoring the amount of fluid in the fluid-collecting chamber, and
maintaining the amount of fluid within the fluid-collecting chamber within a target fluid volume range.

12. The method of claim 11, further comprising:
adjusting the target fluid volume range within the fluid-collecting chamber in response to significant temperature changes, in order to counteract temperature effects on the hydraulic system and thereby avoid overpressuring or underpressuring the hydraulic system.

13. A hydraulic circuit with a degasification system, comprising:
a fluid-filled section of a low pressure hydraulic circuit having first and second low pressure fluid ports;
a separation tank, having a separation screen dividing the tank into a first, upper gas-filled section and a second, lower fluid-filled section; and a first tank port located in the first, upper section and a second tank port located in the second, lower section;
a first fluid line connecting the first low pressure fluid port with the first tank port;
a second fluid line connecting the second low pressure fluid port with the second tank port;
a foam generating vessel residing within the first section of the separation tank and below the first tank port, open to the volume of the first section and configured to receive fluid from the first fluid line and allow foam to flow onto the separation screen;
a third tank port in the first section having a gas vent allowing gas to escape the separation tank;
a control valve disposed on the first fluid line for regulating flow through the first fluid line; and
a pump disposed on the second fluid line for drawing fluid from the second tank port toward the second low pressure fluid port.

14. The hydraulic circuit of claim 13 wherein the first fluid line includes along a portion of its length a narrowed inner cross sectional area.

15. The hydraulic circuit of claim 13, additionally comprising:
a foam level sensor located in the first, upper section;
a liquid level sensor located in the second, lower section; and
a CPU using information derived from said sensors to determine control signals to control the pump or the control valve.

16. The hydraulic circuit of claim 13, additionally comprising:
a CPU programmed to adjust the quantity of fluid drawn from the second tank port toward the second low pressure fluid port in order to buffer overall working fluid volume changes in the hydraulic circuit caused by either hot or cold temperatures.

17. The hydraulic circuit of claim 13, wherein the separation screen comprises a mesh of 300-400 openings per linear inch.

* * * * *